United States Patent
Rivard et al.

(10) Patent No.: US 9,582,538 B1
(45) Date of Patent: *Feb. 28, 2017

(54) TREND BASED DISTRIBUTION PARAMETER SUGGESTION

(71) Applicant: Google Inc., Mountain View, CA (US)

(72) Inventors: Matthew Rivard, Toronto (CA); Eric Morris, Toronto (CA)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/234,697

(22) Filed: Aug. 11, 2016

Related U.S. Application Data

(63) Continuation of application No. 14/159,671, filed on Jan. 21, 2014, now Pat. No. 9,449,052.

(51) Int. Cl.
*G06F 7/00* (2006.01)
*G06F 17/30* (2006.01)
(Continued)

(52) U.S. Cl.
CPC ... *G06F 17/30424* (2013.01); *G06Q 30/0244* (2013.01); *G06Q 30/0256* (2013.01)

(58) Field of Classification Search
CPC ........... G06F 17/30864; G06F 17/2705; G06F 17/30663; G06F 17/30023
(Continued)

(56) References Cited

U.S. PATENT DOCUMENTS 7,873,904 B2   1/2011   Wang
7,962,463 B2*  6/2011   Cava ................. G06F 17/30864
                                                                707/706
(Continued)

FOREIGN PATENT DOCUMENTS

WO   0163454      10/2002
WO   2007126903   11/2007

OTHER PUBLICATIONS

"Rainbow loom," [online] [Retrieved on Jan. 21, 2014]; Retrieved from the Internet URL: http://www.google.com/trends/explore?q=rainbow+loom#q=rainbow%20loom&cmpt=q; 1 page.

*Primary Examiner* — Usmaan Saeed
*Assistant Examiner* — Cecile Vo
(74) *Attorney, Agent, or Firm* — Fish & Richardson P.C.

(57) ABSTRACT

Methods, systems, and apparatus, including computer programs encoded on a computer storage medium, for distributing content are disclosed. In one aspect, a method includes accessing data specifying a plurality of search queries. Content distribution campaigns ("campaigns") in which distribution of at least one content item is conditioned on a distribution parameter matching one of the search queries are identified. Two or more similar campaigns are identified, and a search query that matches a distribution parameter in at least one of the similar campaigns is identified as a candidate content distribution parameter. A trend score for the candidate content distribution parameter is determined based on a change in a submission rate of search queries that match the candidate distribution parameter. Suggestion data suggesting the candidate content distribution parameter as an additional content distribution parameter for at least one of the similar campaigns is provided based on the trend score.

17 Claims, 5 Drawing Sheets

(51) Int. Cl.
*G06Q 30/02* (2012.01)
*G06F 13/14* (2006.01)
(58) Field of Classification Search
USPC ......... 707/769, E17.014, 749, E17.069, 752,
707/E17.108, 708, 771
See application file for complete search history.

(56) References Cited

U.S. PATENT DOCUMENTS

| | | |
|---|---|---|
| 8,990,241 B2 * | 3/2015 | Wu .................... G06F 17/3064 707/752 |
| 2008/0263009 A1 | 10/2008 | Buettner et al. |
| 2011/0106610 A1 | 5/2011 | Landis et al. |
| 2011/0314006 A1 | 12/2011 | Sweeney et al. |
| 2013/0185149 A1 | 7/2013 | Koningstein et al. |

* cited by examiner

TREND BASED DISTRIBUTION PARAMETER SUGGESTION

CROSS-REFERENCE TO RELATED APPLICATION

This application is a continuation of and claims priority to U.S. patent application Ser. No. 14/159,671 entitled "Trend Based Distribution Parameter Suggestion" filed on Jan. 24, 2014, the entire contents of which is incorporated by reference for all purposes.

BACKGROUND

This specification relates to data processing and content distribution.

The Internet provides access to a wide variety of resources. For example, video and/or audio files, as well as web pages for particular subjects or that present particular news articles are accessible over the Internet. To identify resources that may satisfy a user's informational need, the user can submit a search query to a search system and receive a search results page that identifies one or more resources. The search results page can include "slots" (i.e., specified portions of the web page) in which advertisements (or other content items) can be presented. Advertisements or other content items that are presented in the slots are selected for presentation by a content distribution system that can perform an auction as part of the selection process.

SUMMARY

In general, one innovative aspect of the subject matter described in this specification can be embodied in methods that include the actions of accessing data specifying a plurality of search queries; identifying, based on at least some of the search queries, content distribution campaigns in which distribution of at least one content item is conditioned on a distribution parameter matching one of the search queries; identifying two or more of the content distribution campaigns that have at least a specified level of similarity to each other; identifying, as a set of candidate distribution parameters and from the plurality of submitted search queries, a set of search queries that match a distribution parameter in at least one of the identified two or more content distribution campaigns having at least the specified level of similarity to each other; determining, for each candidate distribution parameter in the set, a trend score based on a change in a submission rate of the set of search queries that match the candidate distribution parameter; and providing, based on the trend score, suggestion data suggesting at least one of the candidate distribution parameters as an additional distribution parameter for at least one of the two or more content distribution campaigns.

These and other embodiments can each optionally include one or more of the following features. Identifying content distribution campaigns in which distribution of at least one content item is conditioned on a distribution parameter matching one of the search queries can include identifying at least one content distribution campaign in which a broad match distribution parameter differs from one or more of the search queries that match the broad match distribution parameter. Providing suggestion data suggesting at least one of the candidate distribution parameters can include providing suggestion data suggesting at least one of the one or more search queries that match the broad match distribution parameter as an additional distribution parameter for the at least one content distribution campaign.

Determining a trend score can include determining, for a particular candidate distribution parameter, a first number of users that submitted a search query matching the candidate distribution parameter over a first time period; determining, for the particular candidate distribution parameter, a second number of users that submitted a search query matching the candidate distribution parameter that is matched by a particular search query over a second time period that differs from the first time period and occurs after the first time period; and determining the trend score based on a difference between the first number of users and the second number of users. Determining the trend score can include determining that the trend score is an increasing trend score based on the second number being greater than the first number.

Methods can include the actions of determining that a magnitude of the trend score meets a trend threshold, wherein providing suggestion data suggesting at least one of the candidate distribution parameters as an additional distribution parameter can include providing suggestion data suggesting the particular candidate distribution parameter as an additional distribution parameter based on the magnitude of the trend score meeting the trend threshold.

Identifying two or more of the content distribution campaigns that have at least the specified level of similarity to each other can include identifying two or more of the content distribution campaigns that have at least a specified percentage of matching distribution parameters; and determining that a difference between a number of impressions allocated to each of the two or more content distribution campaigns is within a specified difference value; and providing suggestion data suggesting at least one of the candidate distribution parameters as the additional distribution parameter can include providing suggestion data suggesting the at least one candidate distribution parameter to each of the two or more content distribution parameters based on the identification of the two or more content distribution campaigns having at least the specified level of similarity to each other.

Particular embodiments of the subject matter described in this specification can be implemented so as to realize one or more of the following advantages. Content sponsors can be provided suggested distribution parameters based on changing user interest in various search queries (as indicated by changes in search query volume), thereby enabling the content sponsors to distribute content items based on the changing user interests. Users are provided with content items that are more relevant to their search queries by associating newly popular search queries with content distribution campaigns that distribute content items related to the newly popular search queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
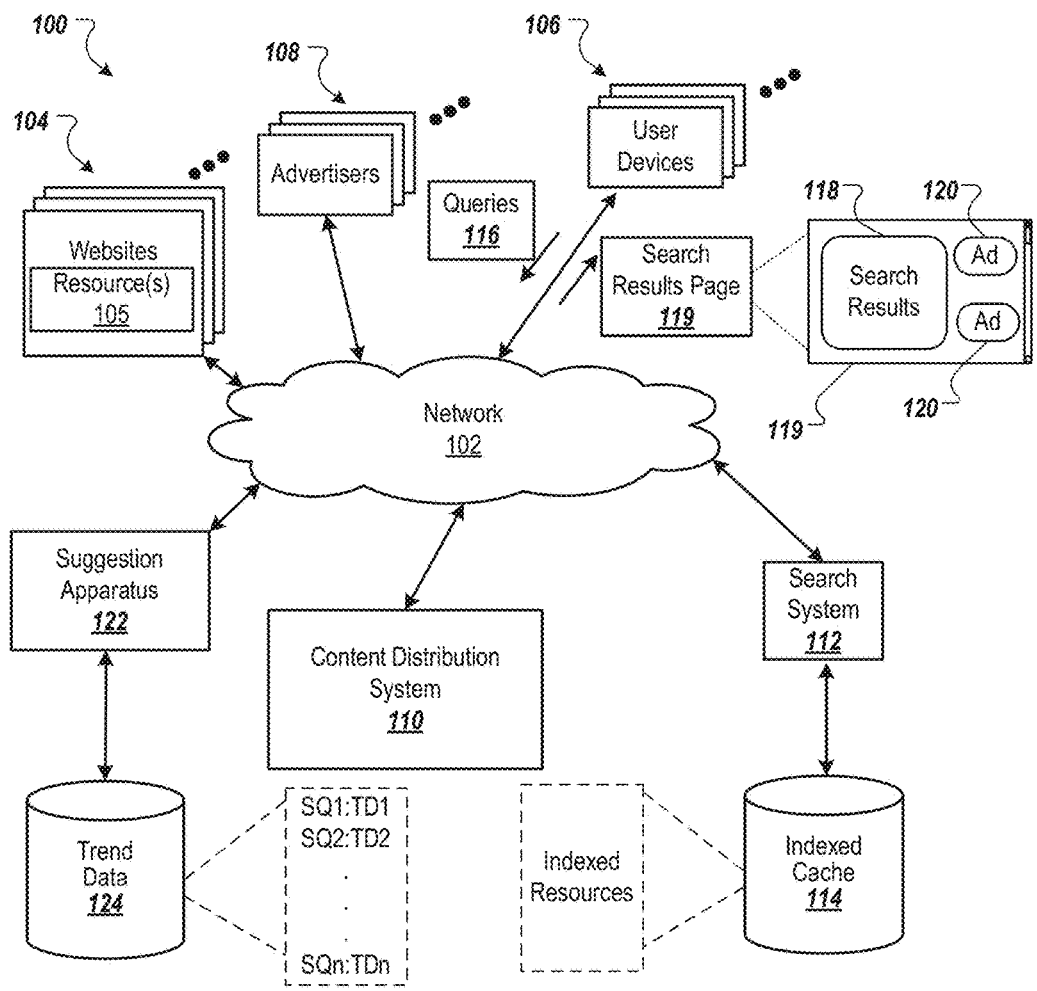
FIG. 1 is a block diagram of an example environment in which content distribution system distributes content to user devices.

Content distribution parameters are suggested to content sponsors (e.g., advertisers) based on changes in search query volume. For example, when search query volume for a particular search query (or set of search queries) increases at least a specified amount, that particular search query can be suggested to one or more content sponsors as an additional content distribution parameter that is used to condition presentation of content items provided by the content sponsor.

For example, assume that Toy Company 1 uses the phrase "toy truck" as a content distribution parameter for one of its advertisements, and that a broad match type is selected for the phrase toy truck. The selection of a broad match type for the phrase "toy truck" is an indication that there need not be an exact match between search queries and the phrase "toy truck" in order for the advertisement to be eligible for presentation. Continuing with this example, assume that "toy truck" is matched by the search query "red toy truck," and that the search query volume for the search query "red toy truck" has increased at least a specified amount relative to a previous period of time (e.g., relative to a previous month or previous year). In some implementations, the increase in the search query volume can result in the search query "red toy truck" being suggested to Toy Company 1 as an additional content distribution parameter because Toy Company 1 uses a content distribution parameter that is matched by the search query associate with the increased search query volume.

As discussed in more detail below, other content sponsors to which the particular search query is suggested as an additional content distribution parameter can be selected, at least based on part, on a level of similarity between the other content sponsors and content sponsors that already use a content distribution parameter that is matched by the particular search query. For example, the additional content distribution parameter can be suggested to other content sponsors that use content distribution parameters that are similar to those used by Toy Company 1 and/or are otherwise identified as being similar to Toy Company 1 (e.g., in a same industry as Toy Company 1).

The search query volume for a particular query can be determined on an aggregate basis so that the search query volume does not include user identifiable information. In some implementations, search query volume information is only provided and/or used for search queries that have been received at least a minimum number of times to facilitate use of search queries that do not include user identifiable information.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content sen.er that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

For purposes of example, the description that follows refers to advertisements as the content items that are distributed to user devices and advertisers as the content sponsors that provide the advertisements. The description is also applicable to distribution of other types of content items (e.g., audio files, video files, or other content) that are provided to user devices.

FIG. 1 is a block diagram of an example environment 100 in which content distribution system 110 distributes content to user devices 106. The example environment 100 includes a network 102 such as a local area network (LAN), wide area network (WAN), the Internet, or a combination thereof. The network 102 connects websites 104, user devices 106, advertisers 108, and the advertisement management system 110. The example environment 100 may include any number of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website 104.

A resource 105 is data provided by the website 104 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources, the environment can include a search system 112 that identifies the resources by crawling and indexing the resources provided by the publishers on the websites 104. Data about the resources can be indexed based on the resource to which the data corresponds. The indexed and, optionally, cached copies of the resources are stored in an indexed cache 114.

User devices 106 can submit search queries 116 to the search system 112 over the network 102. In response, the search system 112 accesses the indexed cache 114 to identify resources that are relevant to the search query 116 (e.g., have at least a threshold relevance score with respect to the search query). The search system 112 identifies the resources in the form of search results 118 and returns the search results 118 to the user devices 106 in search results pages 119.

A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages 119 can also include one or more advertisement slots 120 in which advertisements can be presented. The advertisement slots 120 can also facilitate presentation of other content items instead of or in addition to, advertisements.

When search results 118 are requested by a user device 106, the content distribution system 110 receives an advertisement request (or another content item request) requesting advertisements (or another content item) to be provided with the search results 118. The advertisement request can include characteristics of the advertisement slots 120 that are defined for the search results page 119. For example, a size of the advertisement slot 120, and/or media types that are eligible for presentation in the advertisement slot 120 can be provided to the content distribution system 110. Similarly, data specifying one or more terms of the search query 116 in response to which the search results page 119 is being provided can also be included in the advertisement request to facilitate identification of advertisements that are relevant to the search query 116.

Based on data included in the advertisement request, the content distribution system 110 selects advertisements that are eligible to be provided in response to the advertisement request ("eligible advertisements"). Eligible advertisements can include, for example, advertisements having characteristics that match the characteristics of the advertisement slots 118 and that are identified as relevant to the search query 116.

In some implementations, advertisements that are selected as eligible advertisements by the content distribution system 110 are those advertisements having distribution parameters (i.e., data with which distribution of the advertisement is managed) that match the search query 116 and/or other information included in the advertisement request. The advertisement management system 110 can select, from the set of eligible advertisements, one or more advertisements for presentation with the search results page 119. Each advertisement can be selected for presentation based, at least in part, on how well a distribution keyword (also referred to as a keyword) for the advertisement matches the search query and/or on the outcome of an auction.

A distribution keyword, which is a type of distribution parameter, can match a search query by having the same textual content ("text") as the search query. For example, an advertisement (or another content item) associated with the distribution keyword "basketball" can be selected for presentation with a search results page that is provided in response to the search query "basketball," since the search query and the distribution keyword are exactly the same. This is referred to as an exact match.

A distribution keyword can also match a search query by having text that is identified as being sufficiently relevant, or sufficiently similar, to the search query despite having different text than the search query. For example, an advertisement (or another content item) associated with the distribution keyword "basketball" may also be selected for presentation with a search results page that is provided in response to the search query "sports" because basketball is a type of sport, and, therefore, is relevant to the term "sports." This type of match is referred to as a broad match.

For purposes of this document, a distribution keyword can be considered to match a search query (or vice versa) when a measure of similarity (e.g., semantic or topical similarity) between the distribution keyword and the search query meets a specified threshold value. The measure of similarity can be specified based on a cosine distance between the attributes of the search query and the attributes of the distribution keyword, an edit distance between the search query and the distribution keyword, user feedback specifying a measure of similarity between the search query and the distribution keyword, or another indication of similarity between the search query and the distribution keyword (e.g., each of the search query and the distribution keyword being categorized to a same topic in a topical hierarchy).

The content distribution system 110 can also select advertisements for presentation in advertisement slots 120 of a search results page 119 based on results of an auction. For example, the content distribution system 110 can receive bids from advertisers and allocate the advertisement slots to the highest bidders at the conclusion of the auction. The bids are amounts that the advertisers are willing to pay for presentation (or selection) of their advertisement with a search results page. For example, a bid can specify an amount that an advertiser is willing to pay for each 1000 impressions (e.g., presentations) of the advertisement, referred to as a CPM bid. Alternatively, the bid can specify an amount that the advertiser is willing to pay for a user interaction with (e.g., a click-through of or hovering a pointer over) the advertisement or a "conversion" following user interaction with the advertisement. A conversion occurs when a user consummates a transaction related to an advertisement being provided with a search results page. What constitutes a conversion may vary from case to case and can be determined in a variety of ways.

Many different types of auctions can be used to select the advertisements (or other content items) for presentation. First price auctions, generalized second price (GSP) auctions and Vickery-Clarke-Groves auctions are a few examples of auctions that can be performed by the content distribution system 110 to select advertisements (or other content items) for presentation.

An advertiser 108 can select any number of distribution keywords to associate with a particular advertisement (or group of advertisements). However, the time required to manage a set of distribution keywords increases as the number of distribution keywords in the set increases and as the number of advertisements, or groups of advertisements, that are associated with different sets of distribution keywords increases. Additionally, it can be difficult for an advertiser 108 to identify or predict the specific search queries that will be popular at any given time, particularly since user interest in various topics can quickly change. As such, the advertiser 108 may miss out on an opportunity to have its advertisements presented to users submitting recently popular search queries.

The environment 100 includes a suggestion apparatus 122 that suggests distribution parameters for advertisements (or other content items) based on changes in search query volume for search queries that are related to the advertisements. The suggestion apparatus 122 obtains search query trend data 124 that specify, for each of a plurality of search queries, a search query volume indicative of a number of users that have submitted the search query to the search system 112. In some implementations, the search query volume for a particular search query can specify a number of different users that have submitted the particular search query. In some implementations, the search query volume for the particular search query can specify a total number of times that the particular search query has been submitted (e.g., over a specified period), irrespective of whether a same user submitted the particular search query multiple times.

The search query volume for a particular search query is an indication of user interest in topics to which the particular search query is related. For example, user interest in topics or information related to a particular search query is considered to increase as the query volume for the particular search query increases. For brevity, user interest in topics or information related to a particular search query is referred to as user interest in the search query.

The search query volume can be tracked over specified periods, or intervals, (e.g., 1 hour, 1 day, 1 week, 1 month, or 1 year) to determine whether user interest in the search query over a current (or most recent) period has increased or decreased relative to user interest in the search query over one or more previous periods. For example, assume that over one particular day 750,000 users submitted a particular search query to the search system 112. Further assume that on a subsequent day 1,500,000 users submitted a particular search query to the search system 112. In this example, the search query volume for the particular search query increased by 100%, such that user interest in the particular search query is considered to have increased by 100% from the particular day to the subsequent day. Therefore, user interest in the particular search query is considered to have trended up from the particular day to the subsequent day, and this upward trend for the particular search query can be specified in the search query trend data for this particular search query.

In some implementations, the query volume for a particular search query during various time periods can be used to generate a trend score for the particular search query. The trend score can be based, for example, on a difference between the query volume for a most recent time period (e.g., a most recent week or month) and a previous corresponding time period (e.g., a previous week or month). Continuing with the example above, the trend score for the particular query can be a number greater than 1.0 (or some other value) indicating that the search query volume for the particular search query is increasing (e.g., rising from 750,000 on the particular day to 1,500,000 on the subsequent day). Examples for determining a trend score are provided below with respect to FIG. 2A.

As described in more detail below, the suggestion apparatus 122 monitors trend scores for various search queries, and suggests, as additional distribution keywords, search queries having trend scores that meet a trend score threshold. For example, assume that the particular search query in the example above is "red toy truck," and that a particular toy advertiser does not have "red toy truck" specified as a distribution keyword for its advertisements. In this example, in response to determining that the trend score for "red toy truck" meets the trend score threshold, the suggestion apparatus 122 can suggest "red toy truck" as an additional distribution keyword for the particular toy advertiser. The selection of search queries to be suggested as additional distribution keywords and the identification of advertisers (or other content sponsors) to whom the suggestions are made are described in more detail below.

Figure 2A:
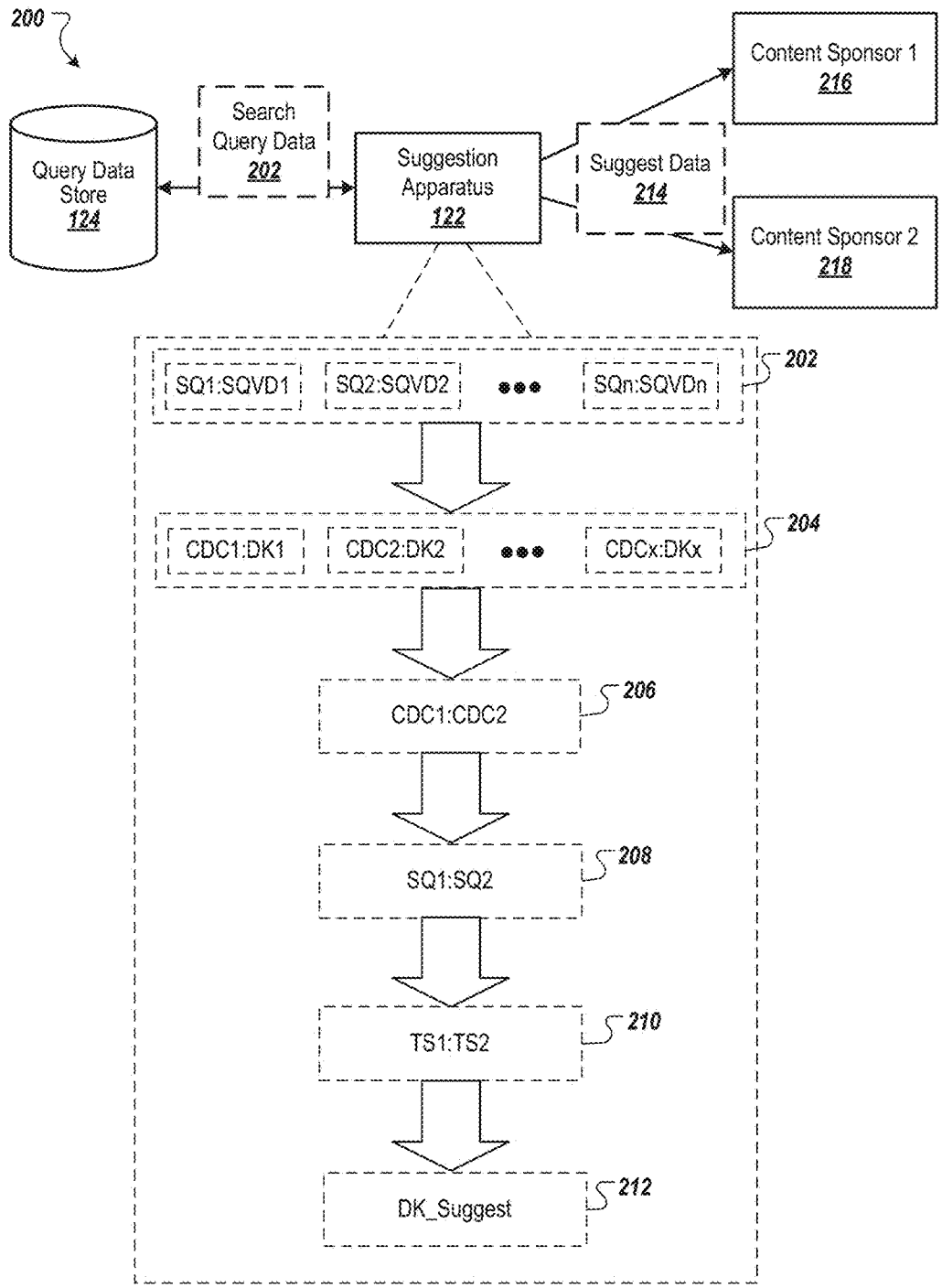
FIG. 2A is an example data flow for suggesting distribution keywords to content sponsors.

FIG. 2A is an example data flow 200 for suggesting distribution keywords to content sponsors (e.g., advertisers).

The data flow 200 begins with the suggestion apparatus 122 obtaining search query data 202. The search query data 202 can include, for example, data specifying a plurality of search queries (e.g., SQ1, SQ2, . . . , SQn) that have been submitted by users. The search query data 202 can also include search query volume data (e.g., SQVD1, SQVD2, . . . , SQTVDn) for the search queries. The search query volume data can specify, for each search query, a search query volume (e.g., a number of times that the corresponding search query was received from user devices). For example, SQVD1 can specify a number of times that the search query SQ1 was received from user devices.

In some implementations, the search query volume data can specify search query volumes corresponding to multiple different periods of time. For example, the search query volume data SQVD1 can delineate the search query volume for SQ1 on a weekly basis, monthly basis, and/or yearly basis. Similarly, the search query volume data SQVS2 can delineate the search query volume for SQ2 on a weekly basis, monthly basis, and/or yearly basis.

The suggestion apparatus 122 uses the search query data 202 to identify a set of content distribution campaigns 204 (e.g., CDC1, CDC2, . . . , CDCx) that have distribution keywords that are matched by at least one of the search queries. As discussed above, a match between distribution keywords and search queries can be determined to exist even when the distribution keywords and search queries differ. For example, when a distribution keyword is associated with a broad match type, the distribution keyword can be matched by search queries that have at least a specified level of similarity to the distribution keyword.

The suggestion apparatus 122 identifies a set of similar content distribution campaigns 206 based, at least in part, on the distribution keywords (e.g., DK1, DK2, . . . DKx) that are included in each of the content distribution campaigns (e.g., CDC1, CDC2, . . . , CDCx). In some implementations, the suggestion apparatus 122 determines a similarity score between two content distribution campaigns based on how much overlap there is between the distribution keywords that are included in the two content distribution campaigns. For example, the suggestion apparatus can compare the distribution keywords that are included in CDC1 with the distribution keywords that are included in CDC2 to determine a portion of the distribution keyword that are included in both CDC1 and CDC2. If the portion of distribution keyword included in both of CDC1 and CDC2 meets a specified amount (e.g., specified percentage), the content distribution campaigns can be considered similar, and therefore included in the set of content distribution campaigns.

In some implementations, each set of similar content distribution campaigns only includes content distribution campaigns that are associated with a similar level of content item performance. For example, the number of impressions that are allocated to each of the content item distribution campaigns in the set can be required to be within a specified amount (e.g., within a specified number or percentage) of other content distribution campaigns in the set. In a particular example, one set of similar content distribution campaigns can be created for content distribution campaigns that receive fewer than a first specified number of impressions (e.g., per week or per month), a second set of similar content distribution campaigns can be created for content distribution campaigns that receive at least the first specified number of impressions, but fewer than a second specified number of impressions (e.g., per week or per month), and a third set of similar content distribution campaigns can be created for content distribution campaigns that receive at least the second specified number of impressions. For purposes of example, the following discussion will refer to one set of similar campaigns 206 that includes CDC1 and CDC2.

The suggestion apparatus 122 identifies, from the search query data, a set of search queries 208 (e.g., SQ1 and SQ2) that match a distribution keyword in at least one of the content distribution campaigns from the set of similar content distribution campaigns 206. The match can be an exact match or a broad match. The set of search queries 208 can be considered candidate distribution keywords for the content distribution campaigns (e.g., CDC1 and CDC2) that are included in the set of similar content distribution campaigns 206.

The suggestion apparatus 122 determines a set of trend scores 210 for the set of search queries 208. The set of trend scores 210 can include a separate trend score for each of the search queries in the set of search queries 208. For example, the suggestion apparatus can determine the trend score TS1 for SQ1 and determine the trend score TS2 for SQ2.

In some implementations, the trend score for each search query is based on a difference between a current search query volume for the search query relative to a historical search query volume for the search query. For example, for a particular search query, the suggestion apparatus 122 can compare the search query volume for a most recent week to a search query volume for a week preceding the most recent week. If the search query volume has increased from the preceding week to the most recent week, the suggestion apparatus 122 can give the particular search query a trend score indicating that the search query volume for the particular search query has increased, and is therefore more popular. If the search query volume has decreased from the preceding week to the most recent week, the suggestion apparatus 122 can give the particular search query a trend score indicating that the search query volume for the particular search query has decreased, and is therefore less popular that it was.

In some implementations, the trend score for a particular search query can be determined based on the search query volume corresponding to multiple different periods of time. For example, the trend score can be based on a combination of a week to week change in search query volume, a month to month change in search query volume, and/or a year to year change in search query volume for the particular search query. In a particular example, the trend score can be a weighted combination of the week to week change, the month to month change, and the year to year change in search query volume. In some implementations, relationship 1 is used to determine the trend score for a particular search query.

$$TS_i = ABS(WW\Delta_i)*(w_1*WW\Delta_i + w_2*MM\Delta_i + w_3*YY\Delta_i) \quad (1)$$

where, $TS_i$ is the trend score for search query (i);

$ABS(WW\Delta_i)$ is the absolute value of the week to week change in search query volume for the search query (i);

$w_1$ is a weight value for the week to week change in search query volume;

$WW\Delta_i$ is the week to week change in search query volume for the search query (i);

$w_2$ is a weight value for the month to month change in search query volume;

$MM\Delta_i$ is the month to month change in search query volume for the search query (i);

$w_3$ is a weight value for the year to year change in search query volume; and $YY\Delta_i$ is the year to year change in search query volume for the search query (i).

In some implementations, the week to week change in search query volume is a more important indicator regarding the current user interest in a search query than the month to month and/or year to year changes. Therefore, the weight ($w_1$) applied to the week to week change can be higher than the weight ($w_2$) applied to the month to month change and the weight ($w_3$) applied to the year to year change in search query volume. In a particular example, the weight $w_1$ can be set to 0.70, the weight $w_2$ can be set to 0.20 and the weight $w_3$ can be set to 0.10, but other values can be used.

The suggestion apparatus 122 selects at least one of the search queries in the set of search queries 208 for inclusion in a set of suggested distribution keywords 212 ("DK_Suggest"). In some implementations, the set of suggested distribution keywords 212 includes those search queries having a trend score that meets a trend threshold. For example, the trend threshold can be set so that only search queries having trend scores corresponding to an increase in search query volume are selected for inclusion in the set of suggested distribution keywords 212. In some implementations, the trend threshold can be set so that only search queries that have experienced at least a specified increase (e.g., 10%, 20%, 30%, or some other increase) in search query volume (e.g., as specified by the trend scores) are included in the set of suggested distribution keywords 212.

The suggestion apparatus 122 provides suggest data. 214 to one or more of the content sponsors (e.g., 216 and 218) associated with the set of similar content distribution campaigns 206. In some implementations, the suggest data 214 specifies, for each of the content sponsors, one or more distribution keywords from the set of suggested distribution keywords 212. In some implementations, the suggest data 214 provided to each content sponsor 216 and 218 identifies the full set of suggested distribution keywords 212.

In some implementations, the suggested distribution keywords specified by the suggest data provided to at least one content sponsor (e.g., content sponsor 1 216) differs from the suggested distribution keywords specified by the suggest data provided to a different content sponsor (e.g., content sponsor 2 218). For example, the suggest data provided to each different content sponsor can specify only those distribution keywords from the set of suggested distribution keywords 212 that are not already included in the content distribution campaign associated with the content sponsor.

For purposes of illustration, assume that the distribution keywords for content sponsor 1 216 include "distribution keyword 1" and "distribution keyword 2" and that the content distribution keywords for content sponsor 2 218 include "distribution keyword 3" and "distribution keyword 4". For purposes of this example, further assume that the set of suggested keywords 212 include "distribution keyword 1," "distribution keyword 4," and "distribution keyword 5."

In this example, the suggest data provided to content sponsor 1 216 can include data suggesting that "distribution keyword 4" and "distribution keyword 5" be added to the content distribution campaign associated with content sponsor 1 216, because these distribution keywords are not yet included in the content distribution campaign, but not suggest adding distribution keyword 1 because this distribution keyword is already included in the content distribution campaign. Similarly, the suggest data 214 provided to content sponsor 2 218 can include data suggesting that "distribution keyword 1" and "distribution keyword 5" be added to the content distribution campaign associated with content sponsor 2 218 because these distribution keywords are not yet included in the content distribution campaign, but not suggest adding "distribution keyword 4" because this distribution keyword is already included in the content distribution campaign.

In some implementations, the suggest data 214 provided to each content sponsor can include distribution parameter change data suggesting other changes to the content distribution campaign (e.g., other than including additional distribution keywords in the content distribution campaign). For example, the suggest data 214 provided to content sponsor 1 216 may specify that "distribution keyword 1" has an increasing query trend (e.g., an increase in search query volume as indicated by the trend score), and suggest that the content sponsor 1 216 increase a bid associated with distribution keyword 1.

Alternatively, or additionally, the suggest data 214 provided to content sponsor 1 216 can suggest a change to a match type associated with the distribution keyword 1. Continuing with the example above in which "distribution keyword 1" has an increasing query trend, the suggest data 214 provided to content sponsor 1 216 can suggest that content sponsor 1 216 change a match type associated with "distribution keyword 1" from broad match to exact match (or vice versa).

In some implementations, the suggest data 214 can also specify distribution keywords associated with the content sponsor's content distribution account that have a decreasing trend (e.g., a decrease in search query volume as indicated by the trend score), and suggest that the content sponsor remove the distribution keyword from the content distribution campaign, lower a bid associated with the content distribution keyword, and/or change a match type associated with the content distribution keyword.

Figure 2B:
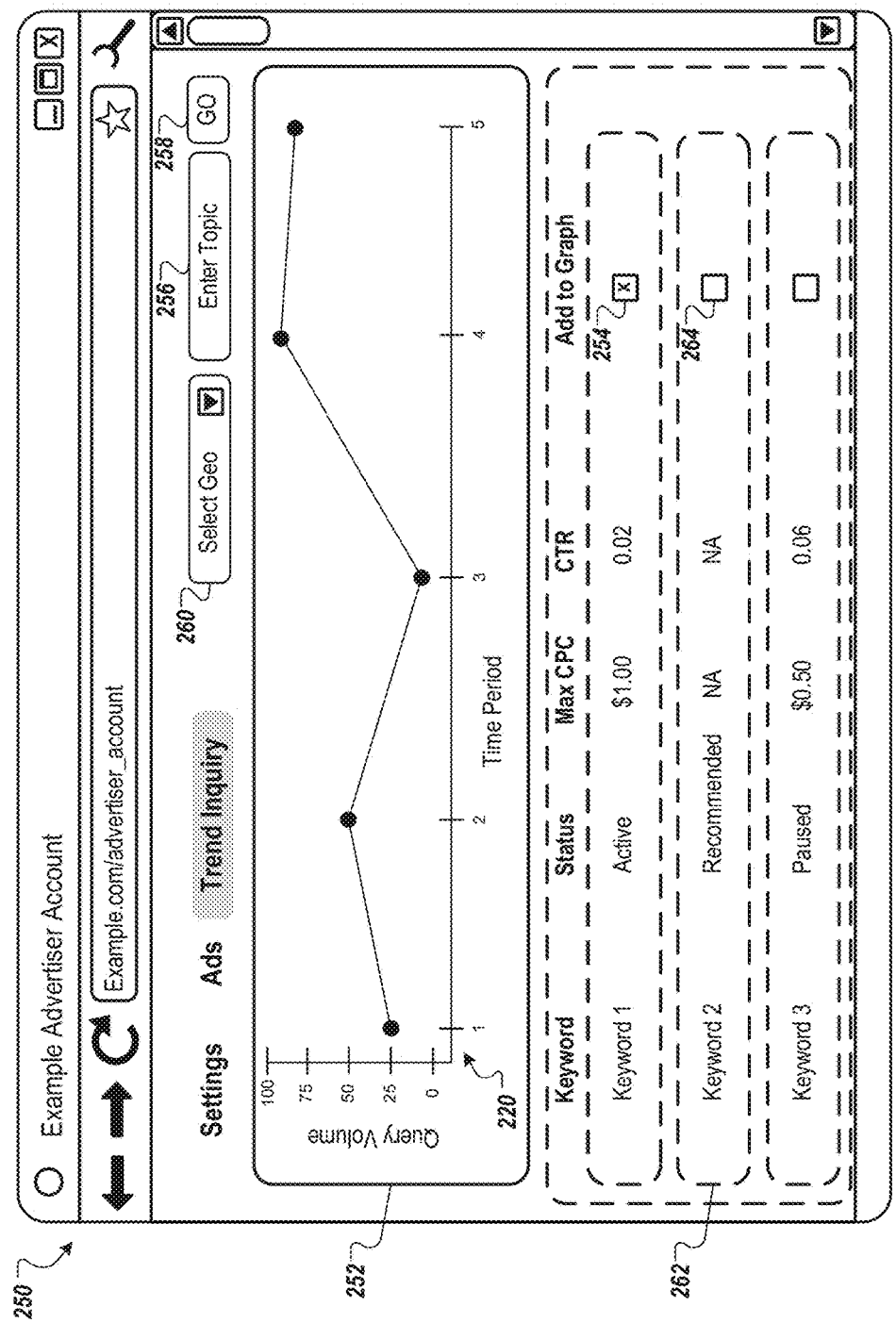
FIG. 2B is an illustration of an example user interface for presenting search query volume information.

In some implementations, the suggestion apparatus can provide a content sponsor trend information related to a geography and/or terms specified by the content sponsor. FIG. 2B is an illustration of an example user interface 250 through which a content sponsor can request trend information and trend information can be presented to the content sponsor. The user interface 250 includes a graph portion 252 in which trend information can be presented to the content sponsor. For example, the graph portion 252 can present historical search query volume for one or more different search queries or topics. In FIG. 2A, the graph portion is presenting the search query volume over multiple different time periods for search queries that match keyword 1 (as indicated by the check mark in the box 254).

In some implementations, a content sponsor can request search query volume information for particular topics by entering one or more terms in the entry element 256 and interacting with (e.g., clicking) the submission element ("go") 258. Using the one or more terms, the suggestion apparatus 122 can identify search queries that match the one or more terms, and provide the search query volume information for those search queries in the graph portion 252. The search query volume information for the identified search queries can be provided with (or without) the historical search query volume for keyword 1.

The content sponsor can also specify one or more particular geographic locations that can be used to collect the search query volume information for the submitted one or more terms (or any of Keyword 1, Keyword 2, or Keyword 3). For example, the content sponsor can interact with the geo element 260 to cause presentation of a drop-down list of geographic regions, and the content sponsor can select one or more of the geographic regions for which the content sponsor wants to obtain search query volume information.

The suggestion apparatus 122 can use the selected geographic regions to identify search query volume information corresponding to the selected geographic regions, and provide search query volume information corresponding to the selected geographic regions. For example, if the content sponsor selected the geographic region "USA" and specified the term "toy," the suggest apparatus could identify the search query volume originating in USA for the search query "toy," and provide that search query volume information in the graph portion 252.

The user interface 250 can also provide the content sponsor with a suggested keyword 262 based on the search query volume information. For example, the user interface 250 can present a suggested keyword along with an indication that the keyword is suggested for use by the content sponsor (e.g., by way of the "recommended" notification). The search query volume information corresponding to the suggested keyword can be presented in the graph portion 252, for example, through interaction with the box 264.

Figure 3:
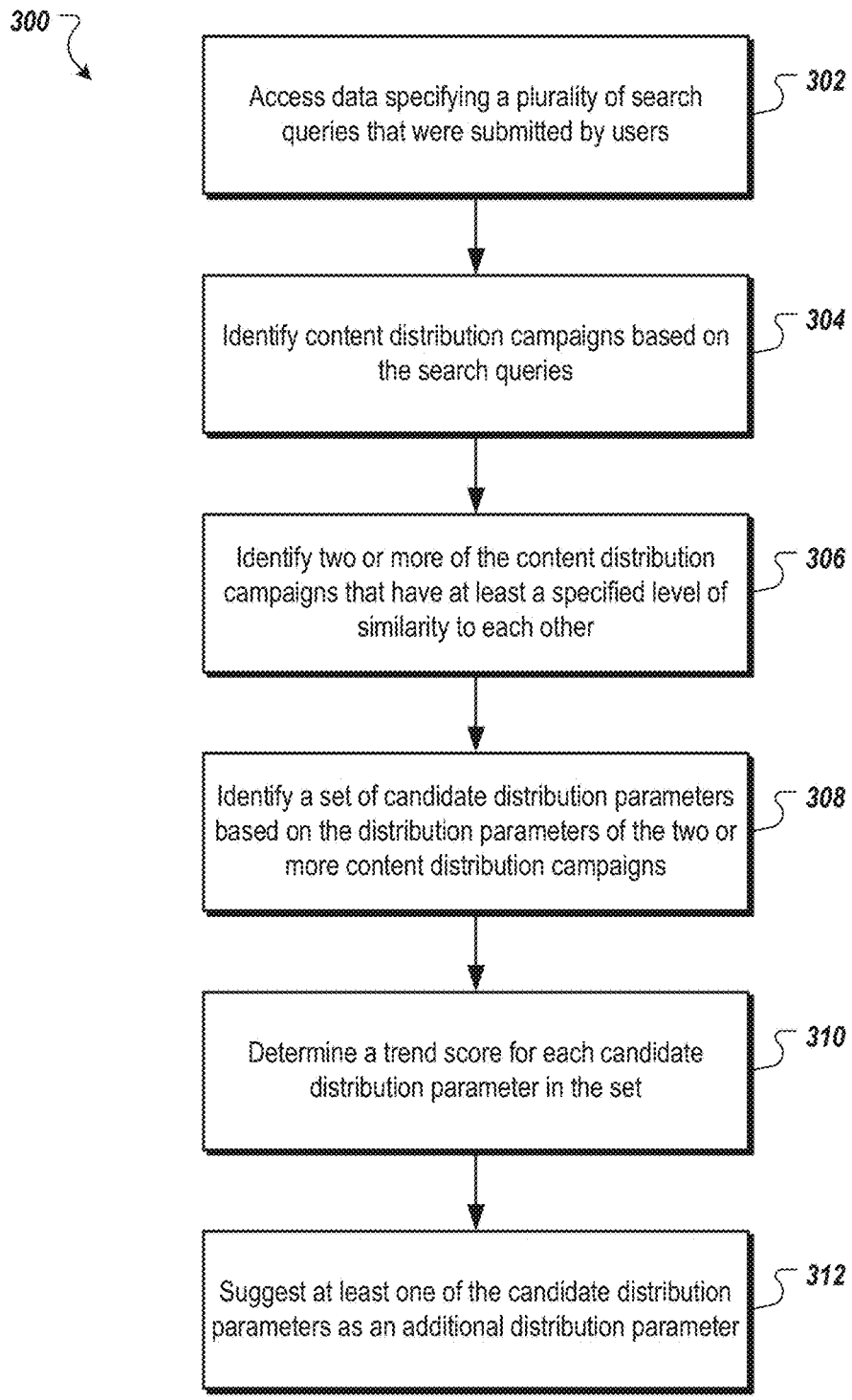
FIG. 3 is a flow chart of an example process for suggesting distribution keywords to content sponsors.

FIG. 3 is a flow chart of an example process 300 for suggesting distribution keywords to content sponsors. The process 300 can be performed, for example, by the suggestion apparatus 122, the content distribution system 110, or another data processing apparatus. The process 300 can also be implemented as instructions stored on computer storage medium, and execution of the instructions by one or more data processing apparatus cause the one or more data processing apparatus to perform some or all of the operations of the process 300.

Data specifying search queries that were submitted by users is accessed (302). In some implementations, the data can specify, for each search query, a search query volume corresponding to the search query. For example, the data can specify a number of users that have submitted the search query over one or more specified periods. In a particular example, the data can specify a number of users that have submitted the query over a most recent week, a previous week (e.g., a week prior to the most recent week), a most recent month, a previous month (e.g., a month prior to the most recent month), a most recent year, and/or a previous year (e.g., a year prior to the most recent year). The data can also specify a number of users that have submitted the query over different periods of time than those listed here.

In some implementations, the search query volume is based on a total number of different users that submitted the query. In some implementations, the search query volume is based on a total number of times that the search query was submitted, irrespective of whether the query was submitted multiple times by a same user or user device.

Content distribution campaigns are identified based on the search queries (304). In some implementations, the identification of content distribution campaigns includes identifying content distribution campaigns in which distribution of at least one content item is conditioned on a distribution parameter matching one of the search queries.

For purposes of illustration, assume that the search query "toy truck" is included in the search queries specified by the obtained data. In this example, the search query "toy truck" can be used to identify the content distribution campaigns. For example, the query "toy truck" can be used to identify content distribution campaigns having content items that are eligible for distribution with search results pages provided in response to the search query "toy truck." The content items that are eligible for distribution with search results pages provided in response to the search query "toy truck" can include content items that are associated with the distribution keyword "toy truck," irrespective of the match type associated with the distribution keyword "toy truck."

In some implementations, the identification of content distribution campaigns can include the identification of at least one content distribution campaign in which a broad match distribution parameter (e.g., a broad match distribution keyword) that differs from the search queries (e.g., is not included in the search queries) that match the broad match distribution parameter. Continuing with the example above, other content items that are eligible for distribution based on the search query "toy truck" may include those content items associated with distribution parameters that are matched by the search query "toy truck." For example, assume that a content item is associated with the distribution keyword "play truck." In this example, the distribution keyword "play truck" may be matched by the search query "toy truck," for example if the distribution keyword "play truck" is specified as a broad match distribution keyword. Thus, in this example, the content distribution campaign that includes the distribution keyword "play truck" can be one of the identified content distribution campaigns.

Two or more of the content distribution campaigns that have at least a specified level of similarity to each other are identified (308). In some implementations, the identification of two or more similar content distribution campaigns is based, at least in part, on a level of similarity between the distribution keyword that are included in each of the content distribution campaigns. For example, content distribution campaigns that include more of the same distribution keywords are considered more similar than content distribution campaigns that include fewer of the same distribution keywords.

In some implementations, the identification of two content distribution campaigns as having at least the specified level of similarity can include identification of two content distribution campaigns having a specified portion (e.g., number or percentage) of matching distribution parameters (e.g., matching keywords). The identification of two content distribution campaigns as similar content distribution campaigns can be based, for example, on a percentage (or absolute number) of the distribution keywords that are shared by the two content distribution campaigns. For example, assume that content distribution campaign 1 includes "distribution keyword 1," "distribution keyword 2," and "distribution keyword 3," and that content distribution campaign 2 includes "distribution keyword 1," "distribution keyword 2," and "distribution keyword 4." In this example, content distribution campaign 1 and content distribution campaign 2 share two out of the three (i.e., 66.67%) of the content distribution keywords. Therefore, content distribution campaign 1 and content distribution campaign 2 can be identified as similar content distribution campaigns if the specified portion of matching distribution parameters is less than 66.67%.

In some implementations, the identification of two content distribution campaigns as having the specified level of similarity to each other can also require a determination that a difference in the number of impressions allocated to the two content distribution campaigns is within a specified difference value (e.g., expressed as a percentage or an absolute value). Continuing with the example above, assume that content distribution campaign 1 receives 1,000,000 impressions per week (e.g., on average), and content distribution campaign 2 receives 1,000 impressions per week (e.g., on average). In this example, content distribution campaign 1 and content distribution campaign 2 may not be identified as having the specified level of similarity (despite the overlap in content distribution keywords) because of the large difference in impressions received by each of the content distribution campaigns. If, however, content distribution campaign 2 received 900,000 impressions per week (e.g., on average) and the specified difference value was 20%, content distribution campaign 1 and content distribution campaign 2 would be identified as having the specified level of similarity.

Example similarity criteria (e.g., matching distribution keywords and/or impression volume) are provided for purposes of illustration. Additional, fewer, or alternative similarity criteria can be used to evaluate the similarities between content distribution campaigns. For example, content distribution campaigns that are associated with a same content sponsor can be considered more similar than content distribution campaigns that are not associated with a same content sponsor. Similarly, content distribution campaigns that are related to a same industry (e.g., both related the toy industry) can be considered more similar than content distribution campaigns that are related to different industries (e.g., one campaign related to the toy industry and another campaign related to the automobile industry).

A set of candidate distribution parameters are identified (308). In some implementations, the set of candidate distribution parameters include the search queries that match a distribution parameter in at least one of the two or more content distribution campaigns. For example, each search query that matches a distribution keyword in the two or more content distribution campaigns that are identified as having at least the specified level of similarity can be identified as candidate distribution keywords for the two or more content distribution campaigns. As discussed above, the match between the search query and the distribution parameters of the two or more content distribution campaigns can be based on a broad match, rather than requiring an exact match.

A trend score is determined for each of the candidate distribution parameters in the set (310). In some implementations, the trend score for a candidate distribution parameter is determined based on a change in a submission rate of the search queries matching the candidate distribution parameter. For example, if the submission rate (e.g., the rate with which users are submitting the query over a specified period of time) of search queries that match a particular candidate distribution keyword has increased over a most recent week, month, and/or year, the trend score for the particular candidate distribution keyword can reflect the increased submission rate. If, however, the submission rate for search queries that match the particular candidate distribution keyword has decreased over a specified period, the trend score for the particular candidate distribution keyword can reflect the decreased submission rate. An example relationship for computing a trend score is discussed above with respect to FIG. 2A, but other relationships can also be used.

In some implementations, the trend score for a particular candidate distribution keyword can be determined based a difference between a first number of users that during a first period submitted a search query matching the particular candidate distribution keyword and a second number of users that during a second period submitted a search query matching the particular candidate distribution keyword. For example, assume that during the first period (e.g., a particular month) a determination is made that 1,000,000 users submitted a search query matching the particular candidate distribution keyword, and that during a second period (e.g., a month following the particular month), 1,500,000 users submitted a search query matching the particular candidate distribution keyword. In this example, the number of users that submitted search queries matching the particular distribution keyword during the second period increased relative to the number of users that submitted search queries matching the particular distribution keyword during the first period. Based on this determination, an increasing trend score (e.g., a trend score signifying an increase in search query volume) can be selected for the particular candidate distribution keyword.

At least one of the candidate distribution parameters is suggested as an additional distribution parameter (312). In some implementations, the at least one distribution parameter is suggested based on the trend scores. For example, the magnitude of the trend scores for the candidate distribution keywords can be compared to a trend threshold (e.g., a specified value) to determine which of the trend scores meets the trend threshold. Based on a determination that the magnitude of at least one of the trend scores meets the trend threshold, the candidate distribution keyword(s) corresponding to the at least one trend score can be suggested as additional distribution parameters.

In some implementations, the content sponsors to which the additional distribution parameters are suggested can be selected based on the two or more content distribution campaigns that were identified as having the specified level of similarity. For example, one or more content sponsors that are associated with the two or more content distribution campaigns can be provided suggestion data suggesting the additional distribution parameters. In some implementations, at least one of the suggested additional distribution parameters is a search query that differs from any of the distribution parameters included in any of the similar content distribution campaigns. For example, the different suggested additional distribution parameter can be a search query that only matched a broad match distribution keyword in one of the similar content distribution campaigns.

Figure 4:
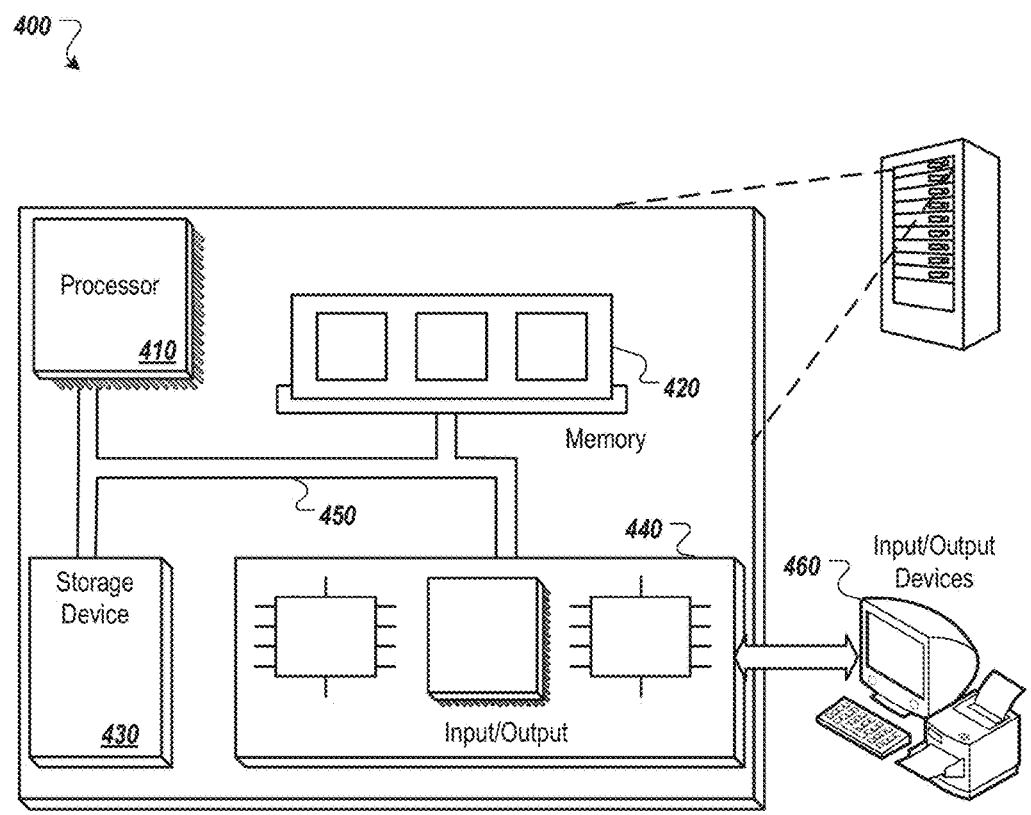
FIG. 4 is block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
    determining, by the one or more data processing apparatus, a first number of users that submitted a given search query over a first time period;
    determining, by the one or more data processing apparatus, a second number of users that submitted the given search query over a second time period that differs from the first time period and occurs after the first time period;
    determining, by the one or more data processing apparatus, a trend score for the given search query based on comparing the first number of users and the second number of users;
    determining, by the one or more data processing apparatus, that the trend score is an increasing trend score based on the second number being greater than the first number;
    identifying, by the one or more data processing apparatus, a distribution parameter in a first content distribution campaign that is matched by the given search query;
    identifying, by the one or more data processing apparatus, a second content distribution campaign that has at least a specified level of similarity with the first content distribution campaign, wherein the specified level of similarity is a specified percentage of matching distribution parameters;
    determining that a difference between a number of impressions allocated to each of the first and the second content distribution campaigns is at least as much as a specified difference value;
    determining, by the one or more data processing apparatus, that the second content distribution campaign does not include the given search query as a distribution parameter for content;
    providing, by the one or more data processing apparatus and based on the trend score and on the specified level of similarity between the first content distribution campaign and the second content distribution campaign, suggestion data suggesting the given search query as an additional distribution parameter for the second content distribution campaign, including providing, by the one or more data processing apparatus, suggestion data suggesting the particular distribution parameter to the second content distribution campaign based on the identification of the first and the second content distribution campaigns having at least the specified level of similarity to each other.

2. The method of claim 1, wherein identifying the first content distribution campaign and the second content distribution campaign comprises identifying at least one content distribution campaign in which a broad match distribution parameter differs from one or more of the search queries that match the broad match distribution parameter.

3. The method of claim 2, wherein providing suggestion data suggesting the particular distribution parameter comprises providing suggestion data suggesting at least one of the one or more search queries that match the broad match distribution parameter as an additional distribution parameter for the second content distribution campaign.

4. The method of claim 1, wherein the specified level of similarity includes at least one of a percentage of matching distribution parameters between the first content distribution campaign and the second content distribution campaign, an absolute number of matching distribution parameters between the first content distribution campaign and the second content distribution campaign, and a specified difference value of a number of impressions allocated to the first content distribution campaign and a number of impressions allocated to the second content distribution campaign.

5. The method of claim 1, comprising:
    identifying, by the one or more data processing apparatus, a second distribution parameter in the second content distribution campaign that is matched by the given search query;
    determining, by the one or more data processing apparatus, that the first content distribution campaign does not include the second distribution parameter as a distribution parameter for content; and
    providing, by the one or more data processing apparatus and based on the trend score and on the specified level of similarity between the first content distribution campaign and the second content distribution campaign, suggestion data suggesting the second distribution parameter as an additional distribution parameter for the first content distribution campaign.

6. The method of claim 1, comprising determining that a magnitude of the trend score meets a trend threshold, wherein providing suggestion data suggesting the particular distribution parameter as an additional distribution parameter comprises providing suggestion data suggesting the particular distribution parameter as an additional distribution parameter based on the magnitude of the trend score meeting the trend threshold.

7. A non-transitory computer storage medium encoded with a computer program, the program comprising instructions that when executed by one or more data processing apparatus cause the one or more data processing apparatus to perform operations comprising:
    determining, by the one or more data processing apparatus, a first number of users that submitted a given search query over a first time period;
    determining, by the one or more data processing apparatus, a second number of users that submitted the given search query over a second time period that differs from the first time period and occurs after the first time period;
    determining, by the one or more data processing apparatus, a trend score for the given search query based on comparing the first number of users and the second number of users;
    determining, by the one or more data processing apparatus, that the trend score is an increasing trend score based on the second number being greater than the first number;
    identifying, by the one or more data processing apparatus, a distribution parameter in a first content distribution campaign that is matched by the given search query;
    identifying, by the one or more data processing apparatus, a second content distribution campaign that has at least a specified level of similarity with the first content distribution campaign, wherein the specified level of similarity is a specified percentage of matching distribution parameters;
    determining that a difference between a number of impressions allocated to each of the first and the second content distribution campaigns is at least as much as a specified difference value;
    determining, by the one or more data processing apparatus, that the second content distribution campaign does not include the given search query as a distribution parameter for content;

providing, by the one or more data processing apparatus and based on the trend score and on the specified level of similarity between the first content distribution campaign and the second content distribution campaign, suggestion data suggesting the given search query as an additional distribution parameter for the second content distribution campaign, including providing, by the one or more data processing apparatus, suggestion data suggesting the particular distribution parameter to the second content distribution campaign based on the identification of the first and the second content distribution campaigns having at least the specified level of similarity to each other.

8. The non-transitory computer storage medium of claim 7, wherein identifying the first content distribution campaign and the second content distribution campaign comprises identifying at least one content distribution campaign in which a broad match distribution parameter differs from one or more of the search queries that match the broad match distribution parameter.

9. The non-transitory computer storage medium of claim 8, wherein providing suggestion data suggesting the particular distribution parameter comprises providing suggestion data suggesting at least one of the one or more search queries that match the broad match distribution parameter as an additional distribution parameter for the second content distribution campaign.

10. The non-transitory computer storage medium of claim 7, wherein the instructions cause the one or more data processing apparatus to perform operations comprising determining that a magnitude of the trend score meets a trend threshold, wherein providing suggestion data suggesting the particular distribution parameter as an additional distribution parameter comprises providing suggestion data suggesting the particular distribution parameter as an additional distribution parameter based on the magnitude of the trend score meeting the trend threshold.

11. The non-transitory computer storage medium of claim 7, wherein the instructions cause the one or more data processing apparatus to perform operations comprising:
identifying, by the one or more data processing apparatus, a second distribution parameter in the second content distribution campaign that is matched by the given search query;
determining, by the one or more data processing apparatus, that the first content distribution campaign does not include the second distribution parameter as a distribution parameter for content; and
providing, by the one or more data processing apparatus and based on the trend score and on the specified level of similarity between the first content distribution campaign and the second content distribution campaign, suggestion data suggesting the second distribution parameter as an additional distribution parameter for the first content distribution campaign.

12. A system comprising:
a data store storing search query data;
one or more data processing apparatus that interact with the data store and execute instructions that cause the one or more data processing apparatus to perform operations including:
determining, by the one or more data processing apparatus, a first number of users that submitted a given search query over a first time period;
determining, by the one or more data processing apparatus, a second number of users that submitted the given search query over a second time period that differs from the first time period and occurs after the first time period;
determining, by the one or more data processing apparatus, a trend score for the given search query based on comparing the first number of users and the second number of users;
determining, by the one or more data processing apparatus, that the trend score is an increasing trend score based on the second number being greater than the first number;
identifying, by the one or more data processing apparatus, a distribution parameter in a first content distribution campaign that is matched by the given search query;
identifying, by the one or more data processing apparatus, a second content distribution campaign that has at least a specified level of similarity with the first content distribution campaign, wherein the specified level of similarity is a specified percentage of matching distribution parameters; and
determining that a difference between a number of impressions allocated to each of the first and the second content distribution campaigns is at least as much as a specified difference value;
determining, by the one or more data processing apparatus, that the second content distribution campaign does not include the given search query as a distribution parameter for content;
providing, by the one or more data processing apparatus and based on the trend score and on the specified level of similarity between the first content distribution campaign and the second content distribution campaign, suggestion data suggesting the given search query as an additional distribution parameter for the second content distribution campaign, including providing, by the one or more data processing apparatus, suggestion data suggesting the particular distribution parameter to the second content distribution campaign based on the identification of the first and the second content distribution campaigns having at least the specified level of similarity to each other.

13. The system of claim 12, wherein identifying the first content distribution campaign and the second content distribution campaign comprises identifying at least one content distribution campaign in which a broad match distribution parameter differs from one or more of the search queries that match the broad match distribution parameter.

14. The system of claim 13, wherein providing suggestion data suggesting the particular distribution parameter comprises providing suggestion data suggesting at least one of the one or more search queries that match the broad match distribution parameter as an additional distribution parameter for the second content distribution campaign.

15. The system of claim 12, wherein the instructions cause the one or more data processing apparatus to perform operations comprising determining that a magnitude of the trend score meets a trend threshold, wherein providing suggestion data suggesting the particular distribution parameter as an additional distribution parameter comprises providing suggestion data suggesting the particular distribution parameter as an additional distribution parameter based on the magnitude of the trend score meeting the trend threshold.

16. The system of claim 12, wherein the specified level of similarity includes at least one of a percentage of matching distribution parameters between the first content distribution campaign and the second content distribution campaign, an absolute number of matching distribution parameters between the first content distribution campaign and the second content distribution campaign, and a specified difference value of a number of impressions allocated to the first content distribution campaign and a number of impressions allocated to the second content distribution campaign.

17. The system of claim 12, wherein the instructions cause the one or more data processing apparatus to perform operations comprising:
   identifying, by the one or more data processing apparatus, a second distribution parameter in the second content distribution campaign that is matched by the given search query;
   determining, by the one or more data processing apparatus, that the first content distribution campaign does not include the second distribution parameter as a distribution parameter for content; and
   providing, by the one or more data processing apparatus and based on the trend score and on the specified level of similarity between the first content distribution campaign and the second content distribution campaign, suggestion data suggesting the second distribution parameter as an additional distribution parameter for the first content distribution campaign.

* * * * *